Figure 1:
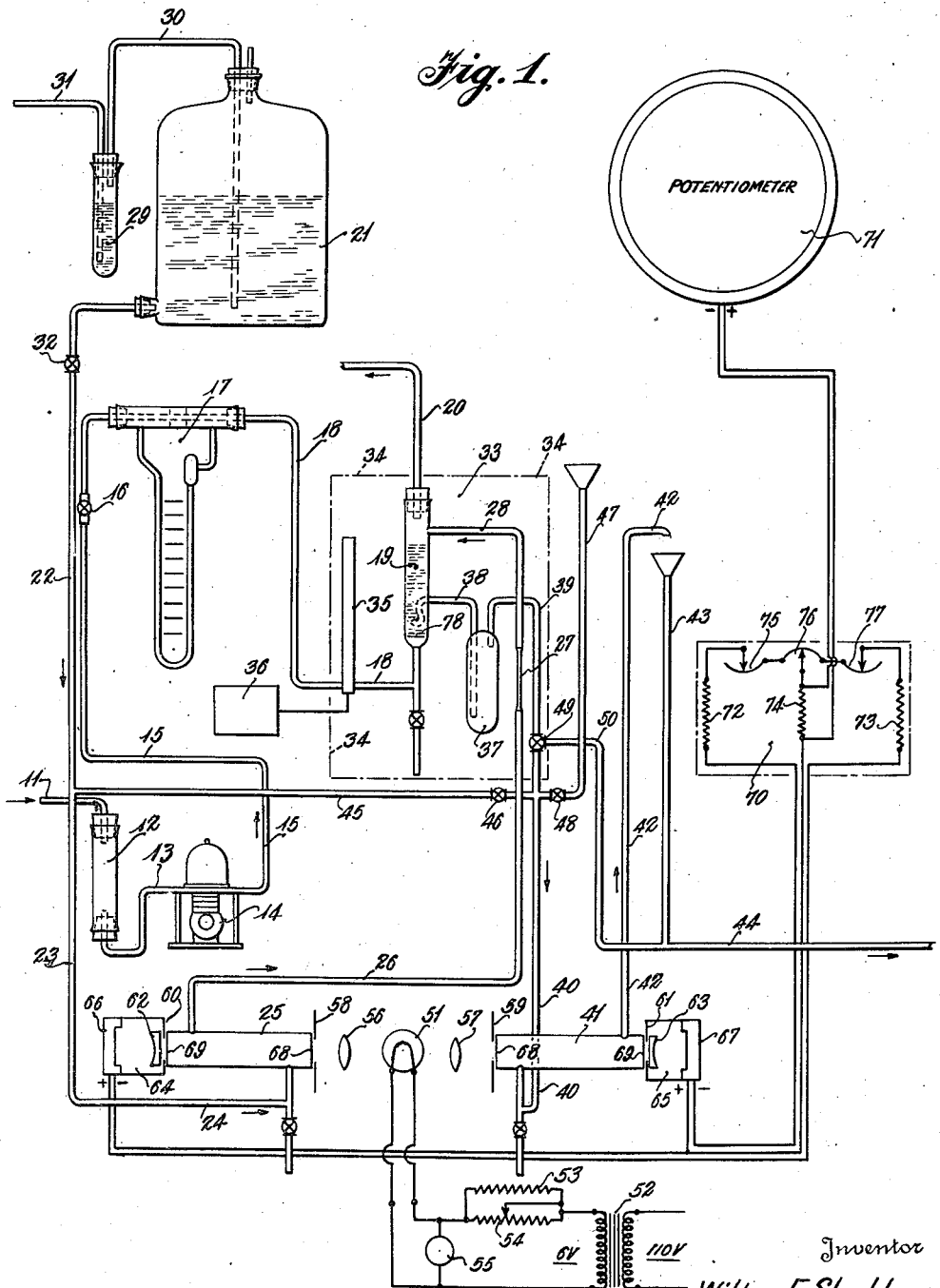

Dec. 24, 1946.  W. E. STACKHOUSE  2,413,261
METHOD AND APPARATUS FOR HYDROGEN SULFIDE DETERMINATION
Filed Nov. 30, 1939  3 Sheets-Sheet 2
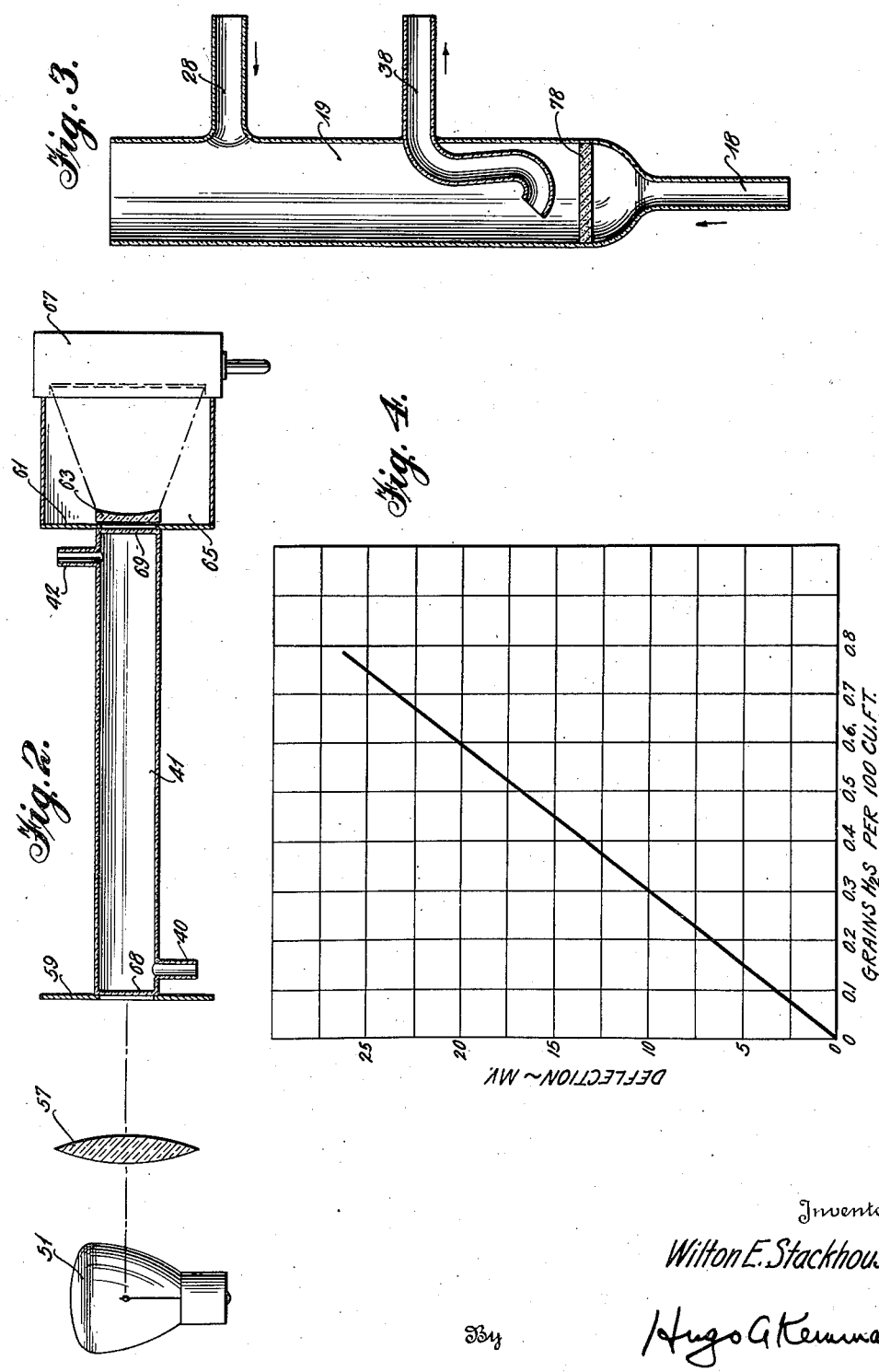
Inventor
Wilton E. Stackhouse
By Hugo G. Kenman
Attorney Patented Dec. 24, 1946

2,413,261

UNITED STATES PATENT OFFICE 2,413,261

METHOD AND APPARATUS FOR HYDROGEN SULFIDE DETERMINATION

Wilton E. Stackhouse, Springfield, Pa., assignor to The United Gas Improvement Company, a corporation of Pennsylvania Application November 30, 1939, Serial No. 306,816

9 Claims. (Cl. 23—232)

This invention relates to a novel process and apparatus for the determination of hydrogen sulfide.

More particularly, this invention relates to a method for the determination of hydrogen sulfide content of gases such as heating and illuminating gas, or air, by means of a combined colorimetric and photometric process and apparatus.

The determination of the hydrogen sulfide content of gases is a serious problem present in a number of industries.

For example, there may be mentioned the necessity of maintaining the atmosphere within artificial silk manufacturing plants, particularly rayon plants, relatively free of hydrogen sulfide in order to prevent an atmosphere toxic to workmen.

As a further example, the manufactured gas industry is required by law to remove all but a trace of hydrogen sulfide from gas supplied to the consumer.

The permissible content of hydrogen sulfide in heating and illuminating gas is generally set at not over 0.1 grain of hydrogen sulfide per hundred cubic feet of gas. Prior methods for the determination of the hydrogen sulfide content have been unsatisfactory, generally, because of the difficulty of determining hydrogen sulfide content of 0.1 grain per hundred cubic feet or less, and because of the delay between the taking of the sample and the analysis thereof.

For example, the usual method for the estimation of hydrogen sulfide content of gases is by the use of lead acetate test paper. The gas to be tested is passed over a strip of filter paper moistened with lead acetate solution. A gas containing 0.1 grain hydrogen sulfide per 100 cubic feet will produce a "faint" discoloration in the lead acetate test paper after a three-minute exposure of the paper to the gas.

Obviously, this test is not suitable for quantitative estimations of hydrogen sulfide concentration, and since the threshold value is the legal maximum, it is of little value as a control test.

Although it is possible to determine hydrogen sulfide concentration quantitatively by reacting the hydrogen sulfide contained in a measured volume of gas with cadmium chloride or acetate solution, forming cadmium sulfide, and thereafter determining the cadmium sulfide iodometrically by titration with iodine solution, this method requires passage of gas through the cadmium solution at a relatively low rate to assure complete absorption of the hydrogen sulfide. With the usual illuminating or heating gas, the absorption must be continued for about three days before sufficient hydrogen sulfide has been absorbed to allow a measurable amount of cadmium sulfide to form. It will, therefore, be apparent that, because of the time element, this quantitative method for determining hydrogen sulfide is of little value as a control method.

It is an object of the present invention to provide a method and apparatus for the determination of small quantities of hydrogen sulfide in gases.

It is a further object of this invention to provide such a method which is not only sensitive to minute quantities of hydrogen sulfide (such as, for example, about 0.3 P. P. M. (volume) or about 0.02 grain H₂S per 100 C. F. gas or air) but which is also readily responsive to changes in hydrogen sulfide content and which makes possible a quantitative determination thereof within a very short time.

Another object of this invention is to provide a novel chemical reagent for the colorimetric determination of hydrogen sulfide.

Other objects of this invention are to provide a method and apparatus which may be rapidly and accurately calibrated and which will require but little servicing by an attendant.

A still further object of this invention is to provide a continuous and automatic method and apparatus in which a colorimetric absorbing reagent is used and wherein registration of color intensity is accomplished by means of photoelectric cells and a potentiometer recorder.

Figure 5:
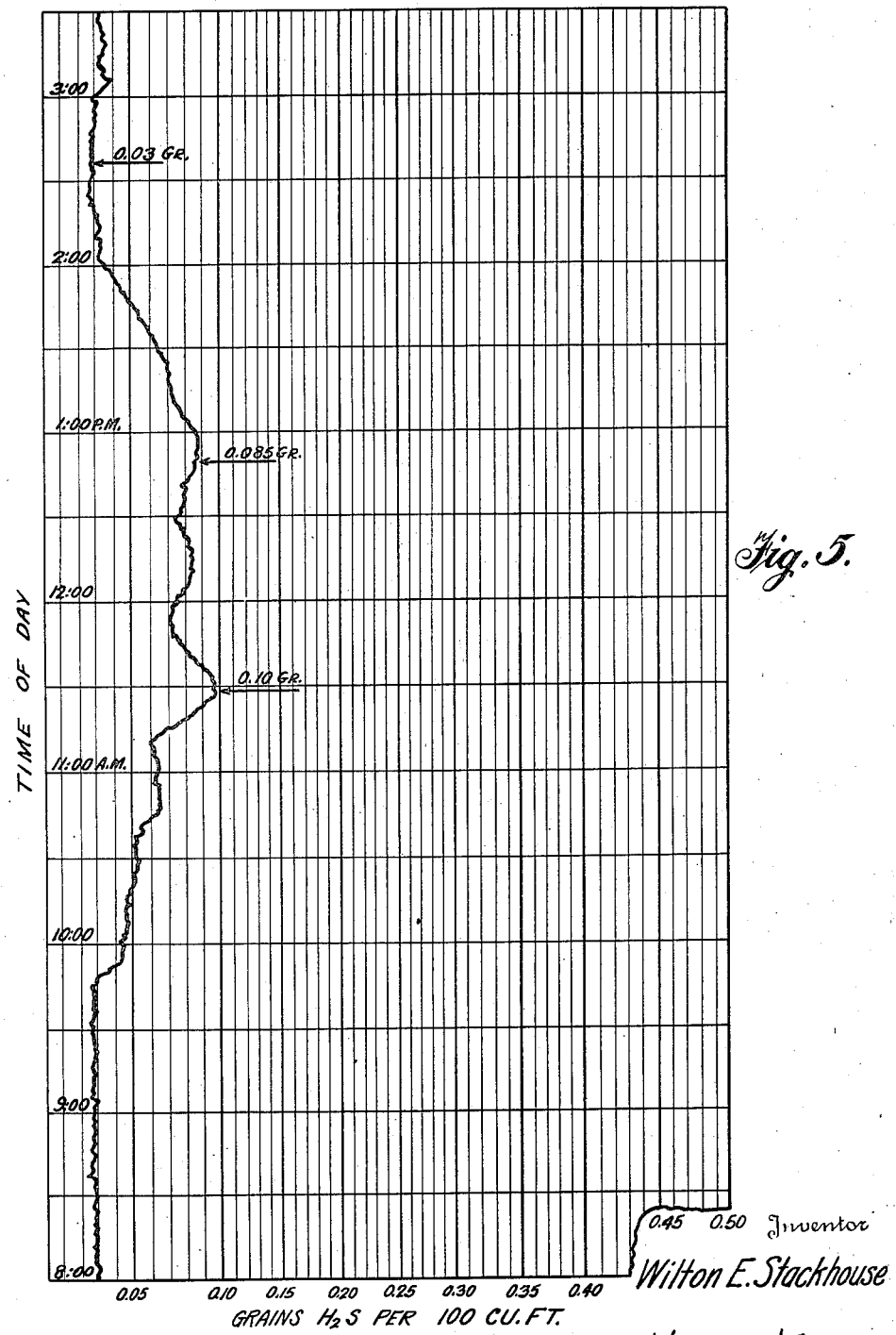

Other objects of this invention will be apparent to those skilled in the art from a reading of the specification and claims, and from the drawings in which Figure 1 is a diagrammatic view of the apparatus, Figure 2 is a detailed vertical section of one-half of the optical train used for measuring the color intensity developed by the absorption apparatus, Figure 3 is a detailed vertical section of the hydrogen sulfide absorber, Figure 4 is a chart showing a calibration curve for the hydrogen sulfide recorder, and Figure 5 is a graph illustrating an actual determination of hydrogen sulfide content of a heating and illuminating gas.

In general, the invention may be described as follows.

A sample of gas from any source which contains—or is suspected of containing—hydrogen sulfide, such as a heating and illuminating gas, or the atmosphere of a rayon plant, is bubbled through an absorption tube at a fixed rate which is governed by some suitable device such as, for example, a needle valve and a flow meter. The absorption tube contains a predetermined quantity of a slowly moving chemical absorbing reagent which, when contacted with hydrogen sulfide, develops a color which may be measured by means of photoelectric cells. From the absorption tube the absorbing reagent passes to a color comparison tube where light is passed therethrough and onto a photoelectric cell sensitive to the color developed in the absorbing solution. At the same time, a portion of the absorbing solution which has not been contacted with the hydrogen sulfide containing gas, is passed through a similar color comparison tube and the intensity of light passing therethrough is measured upon another photoelectric cell. The difference in intensity of the light reaching the two photoelectric cells is measured by an electrical system which records the difference upon a potentiometer or similar device.

Any suitable absorbing reagent may be employed which develops shades of color in the presence of hydrogen sulfide, the intensity being proportional to the hydrogen sulfide concentration. The absorbing reagent employed in this apparatus may preferably be selected for its ability to develop a color substantially in the color range of maximum sensitivity or maximum percentage response of the particular photoelectric cell which is used.

A detailed description of the method and one apparatus for determining hydrogen sulfide content of gases follows, during which reference will be made to the drawings, particularly Figure 1.

The gas to be tested may enter the apparatus of Figure 1 through tube 11 and be passed through a filter 12 to remove any suspended solid matter. This filter may consist of absorbent cotton, glass wool or any other suitable filtering material. From the filter 12, the gas may be passed through line 13 to a gas sampling booster pump 14. This pump may be any type of a gas pump such as a motor driven diaphragm pump, or the like. From the pump 14, the gas may be passed through line 15 to any type of a flow regulator wherein the rate of flow of the gas may be adjusted as desired. The flow regulator may, for example, comprise a needle valve 16 and a flow meter 17.

From the flow regulator the gas may be passed through line 18 to the absorber 19 containing the solution which absorbs the hydrogen sulfide from the gas. From the absorber, 19, the gas may be vented to the atmosphere in any desired manner, such as for example, through the line 20.

The absorbing solution contained in the absorber tube 19 is preferably specific for hydrogen sulfide, relatively stable, preferably unaffected by light, and preferably one in which all reaction products are soluble.

The absorbing solution may be supplied to absorber 19 from storage cylinder 21 through lines 22, 23, 24, color comparison tube 25, line 26, capillary tube 27 and line 28.

The storage cylinder 21 is preferably provided with a constant head assembly including a backseal tube 29 connected with the storage cylinder by line 30 and connected to the atmosphere by line 31. A cut-out valve 32 may be placed in line 22 to aid in the initial adjustment of the recorder.

The color comparison tube 25, through which the absorbing solution passes from storage cylinder 21 to absorber 19, will be more fully described hereinafter; this tube, however, serves as the blank or standard comparison tube and thus provides any necessary color compensation for the reagent.

The accuracy of this method for the determination of hydrogen sulfide is dependent upon the rate of flow of the absorbing solution to and through the absorber 19. To control this rate of flow, a capillary tube 27 may be provided between lines 26 and 28. This capillary tube 27 is preferably of small bore and so constructed as to pass absorbing solution at a predetermined and preferably constant rate.

Since, however, small bore capillary tubes will give variable delivery rates with changes of temperature, the capillary tube 27 is preferably mounted in a temperature controlled cubicle 33 represented by the dotted line 34 of Figure 1.

The temperature-controlled cubicle 33 contains, in addition to the capillary tube 27, the gas absorber 19, a heating element 35, controlled by a thermostat control apparatus 36, and a reagent aging chamber, such as bulb 37, the purpose of which will be described hereinafter.

The temperature of the temperature-controlled cubicle may be maintained at any desired value, the choice of which will depend upon various factors such as the rate of flow of the absorbing solution, and the rapidity of the development of color in the absorbing solution.

The absorber 19, shown in greater detail in Figure 3, may preferably be a modified Allihn filter tube having a dense Jena sintered-glass disc 78 to effect dispersion of the gas. In general, this type of absorber will give substantially 100% removal of hydrogen sulfide for all concentrations up to 1.5 grains per hundred cubic feet of gas.

From the absorber tube 19 the absorbing reagent flows into the aging bulb 37 through line 38. The aging bulb may preferably be utilized in order to insure full color development before the solution arrives at the color comparison tube for determination of its color intensity.

From the aging bulb 37 the absorbing reagent with its color fully developed may be passed through lines 39 and 40 to color comparison tube 41 wherein the color intensity may be measured as will be more fully described hereinafter.

The color comparison tubes 25 and 41 may preferably be cylinders having windows 68 and 69 of optical grade glass fused to the tube body. The optical grade glass causes no distortion of the light passing through the tubes. Preferably Pyrex glass is utilized throughout the apparatus and particularly for the color comparison tubes 25 and 41.

From the colorimetric cell 41 the solution may be discharged suitably through line 42 into waste lines 43 and 44.

If desired, there may be provided a connection line 45 between lines 22 and 40, equipped with a valve 46 in order that the color comparison tube 41 may occasionally be flushed with the absorbent solution prior to absorption of hydrogen sulfide therein. By means of the connecting line 45, color comparison tube 41 may be filled with absorbent solution and a color comparison thus made between tubes 41 and 25 each filled with the blank absorbent solution.

The color comparison tube 41 may be provided with an inlet 47 connected with line 40 through valve 48, through which a solution containing a known quantity of hydrogen sulfide may be introduced, in order that the apparatus may be calibrated with a standard solution.

In case it may be desired to discharge the absorbent solution after it has passed through the aging chamber 37 and before it enters the color comparison tube the solution may be caused to flow through line 50 into discharge line 44 by means of valve 49 in line 39.

From the hereinabove description, it will be apparent that in the normal operation of this apparatus, color comparison tube 25 will be filled with a solution of the absorbent reagent before contact with gas containing hydrogen sulfide, while color comparison tube 41 will be filled with the absorbent solution after it has been contacted with the hydrogen sulfide containing gas. Since the color developed in the absorbent solution is directly proportional to the content of hydrogen sulfide absorbed therein it will be apparent that a comparison of the color of the solution in tubes 25 and 41 will indicate the quantity of hydrogen sulfide absorbed by the solution. This color comparison is effected in the following manner.

A light source 51 is provided between the color comparison tubes 25 and 41. Preferably, this light source is a low voltage, high intensity lamp which has been aged prior to installation in order to stabilize the light output characteristics.

The light source 51 is preferably operated on the output of a saturated core type of voltage regulator such as that shown in Figure 1 which comprises a transformer 52, resistances 53 and 54 and a volt meter 55.

Between the light source 51 and the color comparison tubes 25 and 41 there is preferably interposed parallelizing lens 56 and 57 respectively, as shown in Figures 1 and 2 of the drawings. Diaphragms 58 and 59 may be positioned between the parallelizing lens and the color comparison tubes to permit the entry of only the desired quantity of light from the light source 51 after passing through the parallelizing lens 56 and 57.

At the ends of the color comparison tubes furthermost from the light source may be positioned diaphragms 60 and 61, and plano-concave lens 62 and 63. Shields 64 and 65 may be provided to completely enclose the space between the diaphragms 60 and 61 and the photoelectric cells 66 and 67.

Photoelectric cells 66 and 67 are provided to determine the intensity of the light passing through the color comparison tubes and the optical train.

These cells are preferably identical and interchangeable, having similar output characteristics.

The electrical output from the photo-electric cells 66 and 67 may be fed into a resistance network 70 so designed and constructed as to make possible any desired calibration curve for pairs of photo-electric cells having different characteristics.

The resistance net-work 70 may comprise fixed and variable resistors arranged as a bridge, the output of which is fed into a potentiometer 71.

For example, the resistance net-work 70 may include fixed resistors 72, 73 and 74 and variable resistors 75, 76 and 77.

A potentiometer recorder 71 may be employed to measure the potential output from the resistance net-work 70.

The recorder may be designed to give any desired response to changes of hydrogen sulfide concentration.

The speed of response is controlled by the solution rate and the volume of the absorber and liquid system following the absorber. The time necessary to reach equilibrium with the new concentration will depend upon the magnitude of the change.

The method and apparatus which comprises this invention having been generally described, there will now be set forth illustrative details of the invention, but it is to be understood that these are exemplary only and that any or all of these may be changed as desired without in any way detracting from the general nature of this invention.

An absorbing solution having the following composition has been found to have the desirable properties for use in an apparatus of the type herein generally described.

| | Per cent by weight |
|---|---|
| Ammonium molybdate, $(NH_4)_6Mo_7O_{24}.4H_2O$ | 2.0 |
| Ammonium sulfate, $(NH_4)_2SO_4$ | 1.0 |

| | Per cent by volume |
|---|---|
| Acid, sulfuric, 1.84 sp. gr. 94% $H_2SO_4$ | 0.01 |
| Distilled water. | |

This reagent develops shades of blue-green in the presence of hydrogen sulfide, the intensity of the color being proportional to the hydrogen sulfide concentration.

The capacity and rate of flow of solution is preferably designed to permit continuous operation for approximately one week periods.

For example, a solution rate of 100 ml. per hour, which is sufficiently fast to give quick response to concentration changes, requires storage of approximately 17 liters of absorbing solution. Therefore, the storage cylinder 21 is preferably of 20 liters capacity. For this solution rate, the aging bulb 37, used in the heated cubicle for development of full color intensity, is constructed to have a volume of 25 ml. Full color of the absorbing solution containing hydrogen sulfide will develop therein if the temperature of the cubicle 33 housing the aging bulb 37 is maintained at 110° F., for the given capacity of such bulb. It will be understood, however, that temperatures above or below this value may be used, with or without employing an aging bulb of correspondingly different capacity.

Any suitable arrangement for the control of the temperature of cubicle 33 at about 110° F. may be used, such as, for example, a temperature-responsive bulb controller operating a 100 ohm, 110 volt electrical resistor as a heater.

The capillary tube 27 may be made of such a size that it will permit any desired rate of flow of absorbing reagent therethrough. I have found a flow rate of about 100 ml. per hour at about 110° F. to be highly satisfactory, although it will be understood that other flow rates may be maintained with equally good results.

As has been pointed out, the particular absorbing reagent to be used may be selected on the basis of its ability to develop—in the presence of hydrogen sulfide—a color of suitable intensity lying substantially in that portion of the color spectrum for which the available photocells possess the maximum sensitivity or percentage response.

For the apparatus herein described, the absorber 19 may preferably be designed to have a solution layer of approximately three inches above the Jena disc 78 with the liquid volume of the absorber approximately 22 ml.

The light source 51 which has been found suitable for the herein described apparatus is a 50 candlepower, 6 volt lamp which had been aged by operating it on 4 volts for a period of approximately 96 hours.

In the power supply for the light source 51, the transformer 52 is suitably one which is rated at 30 watts with a 110 volt input and a 6 volt output. Resistance 53 is preferably a 1 ohm resistor while resistance 54 is preferably a 2 ohm rheostat. Voltmeter 55 is preferably of a range of 0 to 5 or 0 to 10 volts.

The photocell-optical system, as shown in Fig.

2, preferably provides full face illumination of the photo-cells, with a light intensity of about 100 foot-candles.

For example, it has been found that Weston Company Photronic cells, Model No. 594, equipped with discs D-69902, are highly suitable and possess maximum sensitivity for the blue-green portion of the color spectrum.

Accordingly, the absorbing reagent previously described is admirably suited for use with these Weston Photronic cells because it develops a blue-green color in the presence of hydrogen sulfide.

In the resistance network 70, resistors 72 and 73 may preferably be of 200 ohms; resistor 74 preferably of 2000 ohms and resistances 75, 76 and 77 preferably of 400 ohms for the type of cells and the apparatus hereinabove described. It will be understood, however, that resistors of different values may be used if desired.

A range of 0.0 to 0.5 grain of hydrogen sulfide per 100 cubic feet has been found practical for the determination of hydrogen sulfide content of purified city gas. With the method and apparatus herein described, the recording scale will be "straight line uniform" for this range, and may have a least scale division of 0.01 grain.

The herein described recorder has an extremely high sensitivity and will respond to changes in concentration as low as 0.005 grain of hydrogen sulfide per 100 cubic feet.

A rapid speed of response is obtainable with the herein described apparatus, operated in the prescribed manner.

For example, assuming a recorder reading of 0.1 grain of hydrogen sulfide per 100 cubic feet of gas, if a change to 0.2 of a grain occurred, an upward change would be indicated on the recorder in twenty minutes, but one hour would be required to reach the equilibrium reading of 0.2 grain.

The method and apparatus herein described may be calibrated by means of a series of color standards prepared by adding hydrogen sulfide solution of standard strength to the absorbent solution.

For example, a color standard containing 0.002 grain of hydrogen sulfide per 100 ml. of absorbent reagent is added to the color comparison tube 41 through lines 47 and 40 controlled by valve 48, and the color intensity of this standard is measured by means of the photo-electric cell 67. By comparison between the color intensity developed by a solution of known hydrogen sulfide content and a blank of the absorbent solution, there may be plotted the color intensity vs. hydrogen sulfide concentration.

A series of color standards covering the desired range may be used to calibrate the photo-electric cells 66 and 67 over a wide range.

By calculation involving the rate of flow of gas through the absorber and the rate of flow of the absorbing solution through the apparatus, the hydrogen sulfide equivalent in grains per hundred cubic feet of gas is calculated.

Figure 4 represents an illustrative calibration curve in which potentiometer deflection in millivolts is plotted against grains of hydrogen sulfide.

Calibration of the apparatus may be checked as frequently as is found necessary. However, in practical operation it has been found necessary to calibrate the apparatus only at occasional intervals, for instance, about four or six weeks.

Prior to each calibration of the apparatus, it will generally be found advisable to replace the light source 51 in order to insure stable continuous operation over a renewed period of four to six weeks.

The service time for the herein described hydrogen sulfide recorder may average as little as approximately three man-hours per week. Such service involves the preparation of the absorbing solution and a checking of the zero balance of the photo-cells.

Although reference has been made herein to the use of a potentiometer to indicate and/or record changes in hydrogen sulfide concentration of gases, it will be appreciated that other devices may be utilized.

For example, the apparatus may be so designed that changes in hydrogen sulfide concentration, as measured by the output of the photo-electric cells, operate an indicating sensitive relay, for instance, a signalling device such as an alarm.

If desired, the relay may operate a signal light.

In installations where the cost of the recording apparatus might be prohibitive, the use of an indicating relay would permit substantial reduction in apparatus cost and, at the same time, would provide a control not heretofore available for insuring against undesirably high concentrations of $H_2S$ in any gas, such as air or manufactured gas.

Illustrative of the operation of an apparatus as herein described, the following example is given.

*Example*

Figure 5 illustrates the actual recording of hydrogen sulfide content of a commercial gas during a day-time operation between 8 a. m. and 3:30 p. m.

Prior to 9:20 a. m. commercial gas from holders A and B was being introduced to the pushers. During this period, the hydrogen sulfide content of this gas as recorded varied from 0.03 to 0.05 grain per 100 cubic feet. Between 9:20 and 11 a. m., gas holders A, B and C were connected to the pusher inlet main because of load conditions in the distribution system during this period. Following 11 a. m., holders A and B only were used.

By reference to Figure 5, it will be seen that at approximately 9:45 a. m., a definite break in the hydrogen sulfide content of the gas occurred and that the measured hydrogen sulfide content of the gas increased to approximately 0.10 grain per 100 cubic feet at approximately 11:30 a. m. It is thus apparent that the gas in holder C contained an excessively high hydrogen sulfide concentration, due either to improper purification prior to storage, or pick-up of hydrogen sulfide during storage due to decomposition of sulfates in the holder water.

Figure 5 further illustrates the length of time necessary to purge the mains of the gas containing a rather high concentration of hydrogen sulfide.

Due to the speedy response of the herein described apparatus, a change in the hydrogen sulfide content of the commercial gas was apparent within approximately 25 minutes after connection was made to the holder containing the contaminated gas. Likewise, a diminishing content of hydrogen sulfide in the commercial gas of the main was apparent within approximately 30 minutes after the holder containing the contaminated gas had been disconnected from the main.

It will thus be apparent that by means of the herein described apparatus, changes in hydrogen sulfide content of gases may be promptly observed, and the necessary steps taken to prevent further contamination thereof and to maintain the hydrogen sulfide concentration of the gas below the harmful limit generally fixed by statutes or otherwise as 0.1 grain per 100 cubic feet.

While I have indicated a preferred form of gas absorption tube as shown in Figures 1 and 3, it will be understood that other suitable means for effecting intimate contact of the gas to be tested with the liquid absorbing reagent may be used. Thus, it is conceivable that absorption tubes provided with solid contact bodies, such as glass or porcelain beads or other shapes, or balls or chips or other equivalent forms of inert metals or other materials, might be used with satisfactory results.

The flow regulator comprising elements 16 and 17 might similarly be replaced by any other appropriate apparatus for effectively controlling the flow of gas to be tested.

Similarly, the capillary tube 27 for regulating the flow of liquid absorbing reagent to the absorption tube might be replaced by other suitable means for closely controlling the flow of liquids; e. g. Venturi orifice elements.

The so-called aging chamber which may preferably form a part of my system is not restricted to the particular form shown, that is an aging bulb 37, but may in fact take any convenient shape since its function is to delay the flow of liquid absorbing reagent from the absorption tube to the color comparison tube for a convenient length of time such as will permit equilibrium conditions in the solution containing absorbed H₂S to be reached. Thus, instead of a chamber, such means might conceivably take the form of an elongated tube or passage-way between the absorption tube and the color comparison tube. Such elongated passage-way might be coiled in the form of a worm. The aging chamber may, therefore, be regarded broadly as comprising a liquid-retarding passage-way of any suitable size and/or shape which will permit a suitable time interval to elapse between the time any given portion of liquid absorption reagent leaves the absorption tube and the time it enters the color comparison tube.

It will be understood, of course, that any photo-electric cells may be used, or in fact any photo-sensitive means responsive to changes in light intensities.

A solution of the particular composition as herein described may be preferred but it will be understood that any other solution which responds to treatment with H₂S by a change in color or otherwise (e. g., change in turbidity) might be used.

The particular optical system shown in Figure 1 and in greater detail in in Figure 2, may be replaced in whole or in part by any other suitable arrangement of elements such as light source, lens, color comparison tubes, photo-responsive elements, etc. Similarly, the electric circuit for indicating and/or recording the E. M. F. developed by the photo-responsive elements is not restricted to that shown but may be replaced by any other suitable measuring circuit.

The apparatus and method of recording hydrogen sulfide concentration in gases, as herein particularly described, represents specific examples only of the invention for purposes of illustration. Therefore, changes, omissions, additions, substitutions, and/or modifications may be made within the scope of the claims without departing from the spirit of the invention.

I claim:

1. As a colorimetric reagent for hydrogen sulfide determination, a water solution comprising approximately 2% ammonium molybdate, 1% ammonium sulfate and 0.01% sulfuric acid.

2. As a colorimetric reagent for hydrogen sulfide determination comprising a water solution containing ammonium molybdate, ammonium sulfate and sulfuric acid.

3. A method for the determination of the proportion of hydrogen sulfide contained in a gas, comprising intimately contacting under conditions of substantially constant temperature and substantially constant time of contact a continuously flowing stream of said gas under conditions of substantially constant flow with a continuously flowing stream of an absorbing liquid under conditions of substantially constant flow, said absorbing liquid being capable of absorbing hydrogen sulfide from said gas and being capable of reaction with hydrogen sulfide absorbed from said gas in a manner to develop a color intensity proportional to the proportion of hydrogen sulfide thus absorbed, flowing said stream of absorbent after contact with the gas through a chamber of sufficient size to delay flow of the stream for a time sufficient to permit full development of color intensity in said absorbing liquid due to absorbed hydrogen sulfide, and flowing said stream of absorbing liquid thereafter in such positional relationship with a body of such absorbing liquid prior to absorption so that comparison of the color intensity of said stream with the color intensity of said body may be made, and so that the difference in said color intensities may be compared with differences in color intensities representing under substantially the same conditions of hydrogen sulfide determination gases of known hydrogen sulfide content.

4. A method for the determination of the proportion of hydrogen sulfide contained in a gas, comprising intimately contacting under conditions of substantially constant temperature and substantially constant time of contact a continuously flowing stream of said gas under conditions of substantially constant flow with a continuously flowing stream of an absorbing liquid under conditions of substantially constant flow, said absorbing liquid comprising ammonium molybdate, ammonium sulfate and sulfuric acid, and being capable of reaction with hydrogen sulfide absorbed from said gas in a manner to develop a color intensity proportional to the proportion of hydrogen sulfide thus absorbed, flowing said stream of absorbent after contact with the gas through a chamber of sufficient size to delay flow of the stream for a time sufficient to permit full development of color intensity in said absorbing liquid due to absorbed hydrogen sulfide, and flowing said stream of absorbing liquid thereafter in such positional relationship with a body of such absorbing liquid prior to absorption so that comparison of the color intensity of said stream with the color intensity of said body may be made, and so that the difference in said color intensities may be compared with differences in color intensities representing under substantially the same conditions of hydrogen sulfide determination gases of known hydrogen sulfide content.

5. A method for the continuous determination of the proportion of hydrogen sulfide contained in a gas, comprising intimately contacting under conditions of substantially constant temperature and substantially constant time of contact a continuously flowing stream of said gas under conditions of substantially constant flow with a continuously flowing stream of an absorbing liquid under conditions of substantially constant flow, said absorbing liquid containing approximately 2% ammonium molybdate, 1% ammonium sulfate, and 0.01% sulfuric acid, and being capable of reaction with hydrogen sulfide absorbed from said gas in a manner to develop a color intensity proportional to the proportion of hydrogen sulfide thus absorbed, flowing said stream of absorbent after contact with the gas through a chamber of sufficient size to delay flow of the stream for a time sufficient to permit full development of color intensity in said absorbing liquid due to absorbed hydrogen sulfide, thereafter continuously flowing said absorbing liquid of fully developed color intensity through a color comparison zone including a photo-electric cell, continuously flowing said absorbing liquid prior to contact with said gas through another color comparison zone including a photo-electric cell, and photo-electrically differentiating the color intensities of said absorbing liquid in said respective zones to obtain a differential in the potential output of said photo-electric cells proportional to the difference in color intensities of said absorbing liquid before and after contact with said gas, so that said differential in the potential output of said photo-electric cells may be used in determining the proportion of hydrogen sulfide contained in said original gas by comparing said differential in potential output with other differentials in the potential output of said photo-electric cells obtained for differences in color intensities representing under substantially the same conditions of hydrogen sulfide determination gases of known hydrogen sulfide content.

6. An apparatus for the continuous determination of hydrogen sulfide in gases comprising a conduit from a source of gas to be tested and including a gas flow regulator adapted to maintain a substantially constant rate of flow, a gas absorption chamber with which said conduit connects, a reservoir adapted to contain gas absorbing liquid, a conduit connected to said reservoir and said chamber for passing said absorbing liquid to said absorption chamber for contact therein with said gas and including a color comparison tube, means associated with said last mentioned conduit for maintaining a substantially constant rate of flow of said absorbing liquid to said absorption chamber, a second color comparison tube, conduit means connecting said second color comparison tube to said absorption chamber and including an enlarged chamber of such size as to appreciably delay flow of the absorbing liquid and absorbing gas sufficiently to permit completion of the absorption process, and a photo-electric color comparison system associated with said tubes for comparing the color intensities of the liquid passing through said respective color comparison tubes.

7. An apparatus for the continuous determination of hydrogen sulfide in gases, comprising an absorption chamber, a gas conduit connecting said absorption chamber with a source of gas, a gas flow regulator in said gas conduit adapted to maintain a substantially constant rate of flow of said gas, a reservoir adapted to contain gas absorbing liquid, a conduit for passing said absorbing liquid from said reservoir to said absorption chamber for contact therein with said gas, means located in said last-mentioned conduit for maintaining a substantially constant rate of flow of said absorbing liquid to said absorption chamber, a color comparison tube in said last-mentioned conduit, an enlarged chamber connected to said absorption chamber and of such size as to appreciably delay flow of the absorbing liquid and absorbed gas sufficiently to permit completion of the absorption process, a conduit connected to said enlarged chamber, a second color comparison tube in said last mentioned conduit, and a photoelectric color comparison system associated with said tubes for comparing the color intensities of the liquid passing through said respective color comparison tubes.

8. An apparatus for the continuous determination of hydrogen sulfide in gases comprising a conduit from a source of gas to be tested and including a gas flow regulator adapted to maintain a substantially constant rate of flow, a gas absorption chamber with which said conduit connects, a temperature regulating chamber enclosing said gas absorption chamber, a reservoir adapted to contain gas absorbing liquid, a conduit connected to said reservoir and said gas absorption chamber for passing said absorbing liquid to said absorption chamber for contact therein with said gas and including a color comparison tube, means associated with said last mentioned conduit for maintaining a substantially constant rate of flow of said absorbing liquid to said absorption chamber, a second color comparison tube, conduit means connecting said second color comparison tube to said absorption chamber and including an enlarged chamber of such size as to appreciably delay flow of the absorbing liquid and absorbed gas sufficiently to permit completion of the absorption process, and a photoelectric color comparison system associated with said tubes for comparing the color intensities of the liquid passing through said respective color comparison tubes.

9. An apparatus for the continuous determination of hydrogen sulfide in gases comprising a conduit from a source of gas to be tested and including a gas flow regulator adapted to maintain a substantially constant rate of flow, a gas absorption chamber with which said conduit connects, a temperature regulating chamber enclosing said gas absorption chamber, said gas absorption chamber containing gas dispersing means located adjacent the gas inlet thereof, a reservoir adapted to contain gas absorbing liquid, a conduit connected to said reservoir and said gas absorption chamber for passing said absorbing liquid to said absorption chamber for contact therein with said gas and including a color comparison tube, means associated with said last-mentioned conduit for maintaining a substantially constant rate of flow of said absorbing liquid to said absorption chamber, a second color comparison tube, conduit means connecting said second color comparison tube to said absorption chamber and including an enlarged chamber disposed within said temperature regulating chamber, said enlarged chamber being of such size as to appreciably delay flow of the absorbing liquid and absorbed gas sufficiently to permit completion of the absorption process, and a photoelectric color comparison system associated with said tubes for comparing the color intensities of the liquid passing through said respective color comparison tubes.

WILTON E. STACKHOUSE.